Aug. 31, 1948.  D. F. FOLLAND ET AL  2,448,023
FLIGHT INDICATOR
Filed July 28, 1945  4 Sheets-Sheet 1
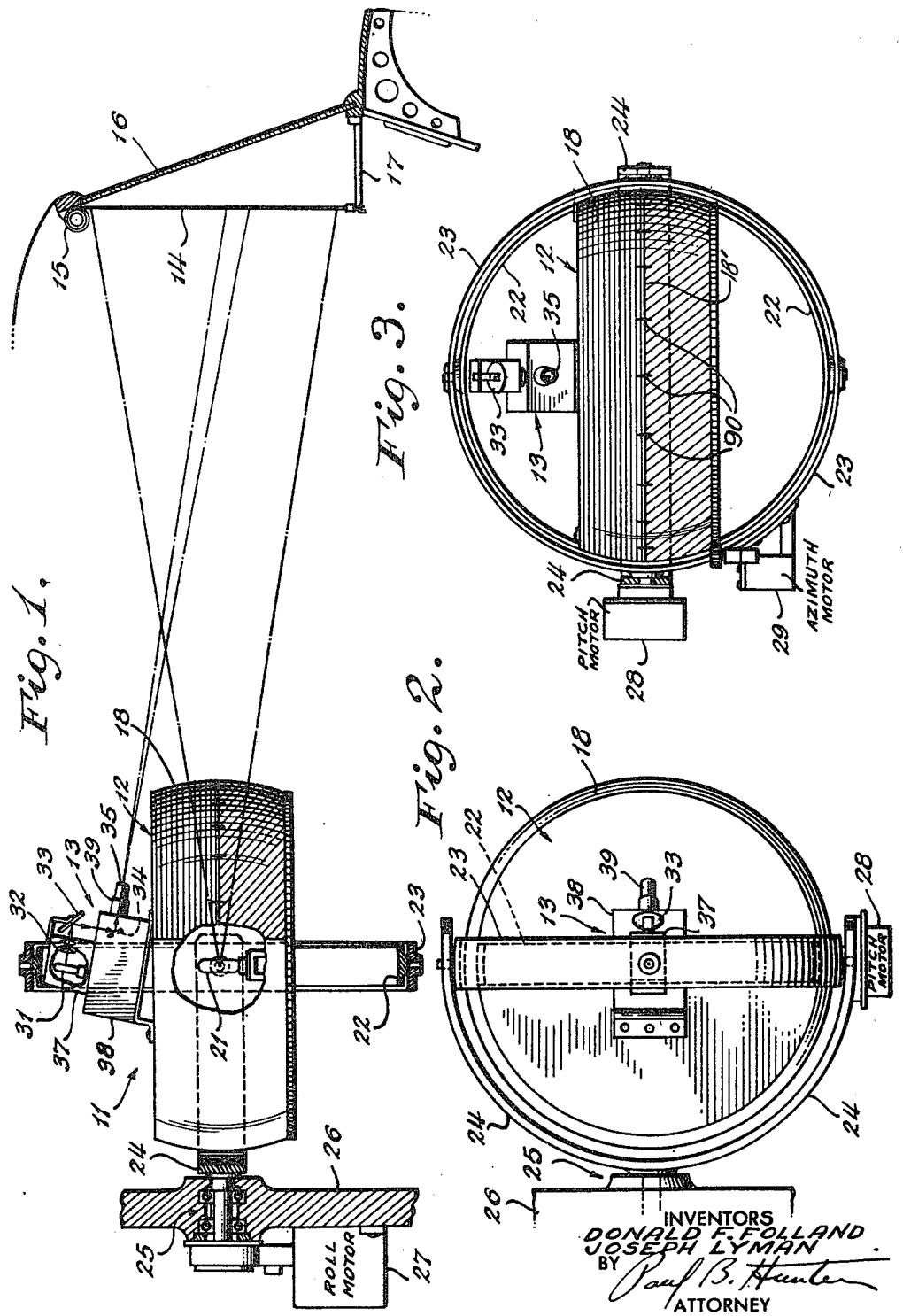

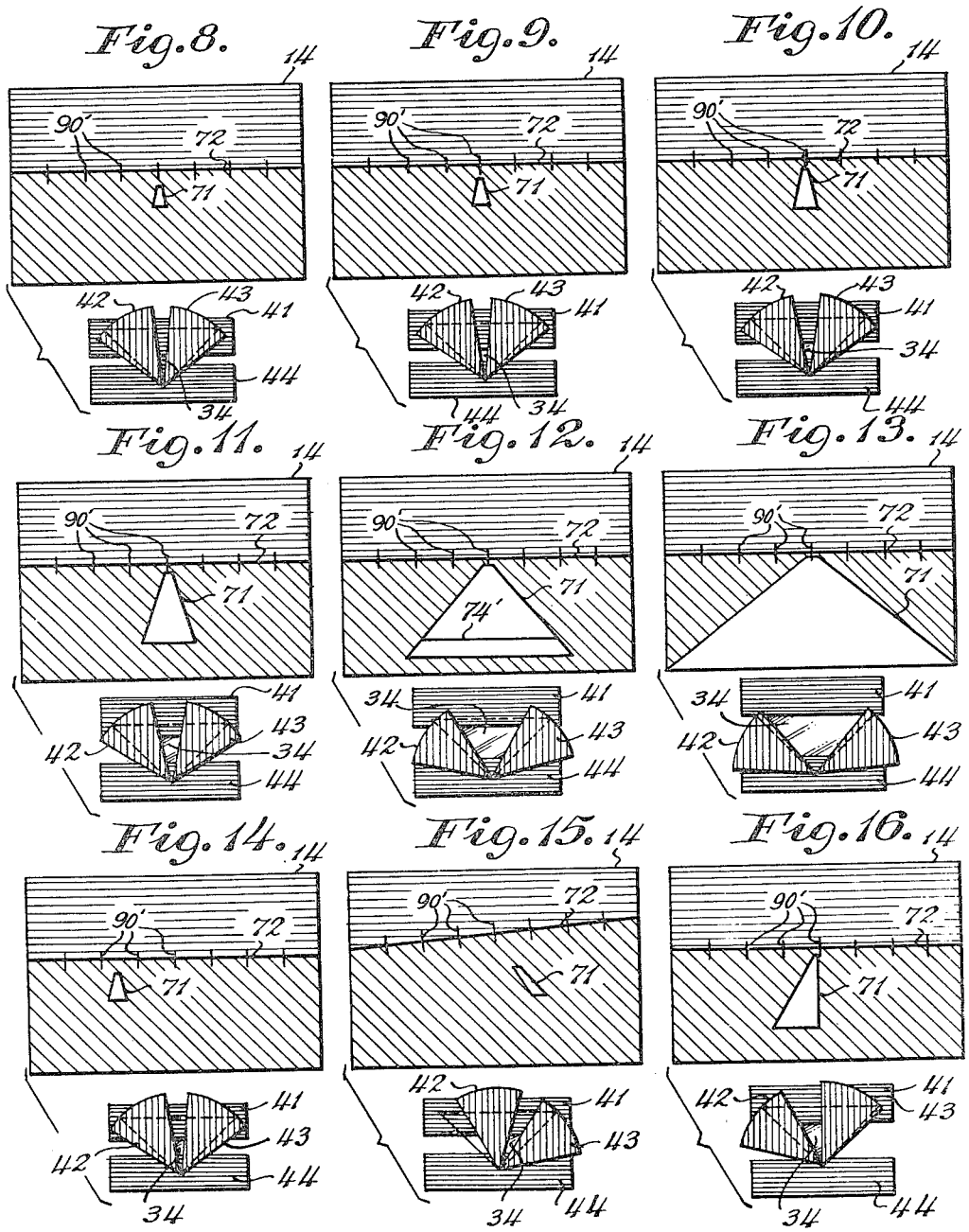

Patented Aug. 31, 1948

2,448,023

UNITED STATES PATENT OFFICE 2,448,023

FLIGHT INDICATOR

Donald F. Folland, East Hempstead, and Joseph Lyman, Huntington, N. Y., assignors to The Sperry Corporation, a corporation of Delaware Application July 28, 1945, Serial No. 607,520

23 Claims. (Cl. 177—311)

The present invention relates to presentation of aircraft flight data to a pilot, and is more particularly concerned with apparatus for presenting to the pilot a transitory picture simulating the view normally seen from the pilot's viewpoint during maneuvers of an aircraft.

In the early stages of a pilot's training, he is taught to operate the controls of an aircraft almost entirely in reliance upon the view of the earth and sky as seen generally ahead of the aircraft. By visual reference to the horizon— the junction line between earth and sky—the pilot manipulates the controls of the aircraft in such a way as to regulate the aircraft orientation about its longitudinal axis and also about its lateral or athwartship axis, i. e., he regulates the aircraft in roll and pitch in accordance with his view of the horizon. Moreover, the pilot is taught to execute landings of the aircraft in accordance with his view of the airport, and particularly of a chosen runway thereon. During landings in conditions of clear visibility, he regulates the attitude of the craft generally in accordance with the apparent relative orientation of the aircraft and the horizon, and he regulates the azimuthal heading of the craft in accordance with the alignment of the craft position relative to the runway. The pilot learns to judge the displacement of the craft relative to a chosen landing path, or line of approach to the desired point of contact with the runway, in accordance with the apparent variation of runway orientation and perspective proportions of a picture plane view of the runway.

At a later stage in a pilot's training, he is taught the techniques of instrument flight and instrument landing which are relied upon during conditions of darkness or of fog when the pilot's visibility beyond the airplane is limited or obscured.

In general, instrument flight and instrument landing are tedious procedures requiring the pilot to divide his attention among numerous separate indicating devices distributed over the instrument panel of the aircraft. Some efforts have been made to present correlated indications of several different phases of the aircraft's performance upon a single compact indicating apparatus, but such combined indications have not hitherto been made to simulate accurately the view beyond the airplane as seen by the pilot during daytime flight with full visibility.

It is an object of the present invention to provide a transitory picture simulating the view which would be seen in daylight flight during fair weather conditions by the pilot of an aircraft. In reliance upon such a simulated picture rather than a number of separate indicating instruments, flight in accordance with radio and gyroscopic instruments may be made to bear a closer and more natural relation to so-called "contact" flight, or flight during conditions of clear visibility.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In accordance with a major feature of the present invention, apparatus is provided for presenting to the pilot of an aircraft or an aircraft trainer a realistic transitory view so resembling the view seen by a pilot during "contact" flight, and of such natural appearance, as to provide the pilot with a continuing illusion of flight of an aircraft during the most favorable conditions of daylight and long-range visibility. Accordingly, the pilot accustoms himself to a routine of flight with an "outdoor" view, whether he operates an aircraft trainer (such as the Link trainer) or flies an aircraft in conditions of good or poor visibility. Thus, a pilot is permitted to operate an aircraft at all times by uniform visual reference standards, and the present requirement of training pilots for greatly different aircraft operation techniques corresponding to different weather conditions is substantially overcome.

The above feature is not only effective with respect to cruising flight at high altitude, as between two terminal cities, but also is made useful in the execution of aircraft landings in reliance upon aircraft positional data derived from an instrument landing radio receiver.

Further features provided by the present invention include superposition upon the sky and ground representation of an indication of the azimuthal heading of the craft, and also superposition upon an airport runway representation of an indication of the predicated landing point of the aircraft. These indications are so merged with the apparently natural view presented to the pilot as to supplement his judgment as to aircraft position and attitude based on the appearance of the simulated sky and earth and runway, without materially detracting from the illusion of a natural scene ordinarily before the eye of the pilot.

In accordance with an embodiment of the present invention, a representation of sky and ground may be formed on a projection screen positioned between the pilot and the windshield of an aircraft or trainer by means of a stabilized "background" projector, the stabilization of which may be provided by gyroscopic control thereof. A further projector, also stabilized, may be provided for superimposing upon the ground representation an image of a runway, which preferably appears as a perspective view, and which preferably is controllable as to orientation and as to its apparent proportions. Such a "runway" projector in an aircraft may be controlled in accordance with data provided by an instrument landing radio receiver, so that the representation of the "runway" presented to the pilot by the present invention is made substantially to duplicate at all times the view of the runway as the pilot would see it in conditions of good visibility.

The above general features and additional detailed features will be made clearly apparent in the following description of an illustrated embodiment of the present invention, described with reference to the accompanying drawings, wherein:

Fig. 1 is a side elevation, partly in section, of a stabilized projector system and projection screen constructed in accordance with the present invention;

Fig. 2 is a plan view, and Fig. 3 is a front elevation, partly in section, of the projector system shown in Fig. 1;

Figure 4:
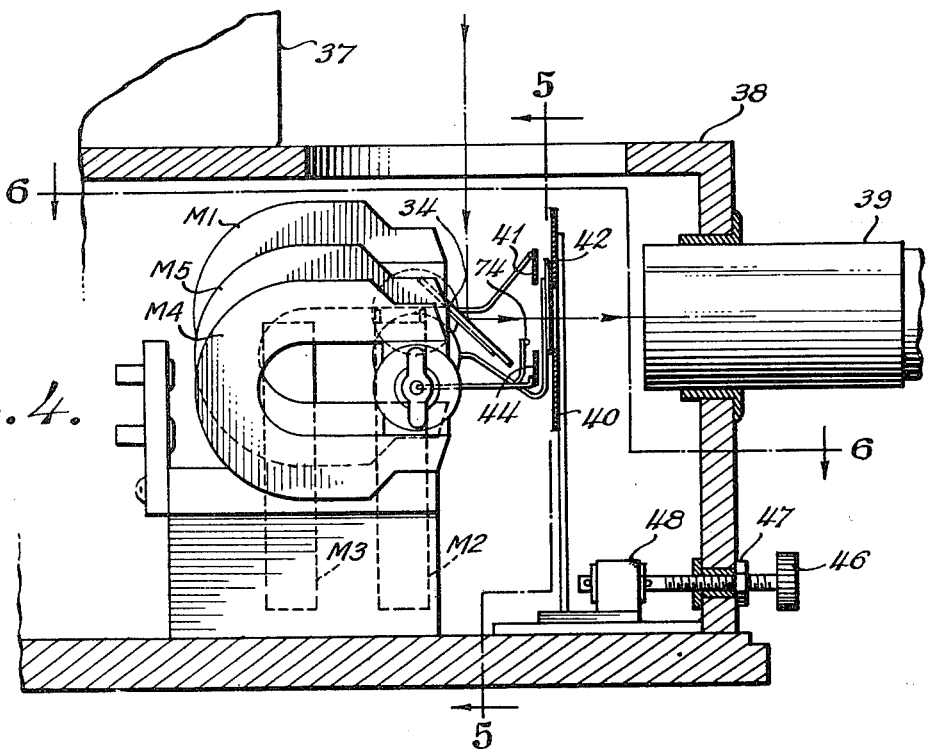
Fig. 4 is a side elevation, partly in section, of a portion of the projector system shown in Figs. 1, 2 and 3.

Figs. 8 through 13 show successive views of the transitory representation of sky, earth and runway as seen at intervals during an ideal approach of an aircraft to a landing point on the represented runway, each figure also including a showing of the positions of movable vanes in a runway projector embodiment suitable for projection of the respective runway representations; and Figs. 14, 15 and 16 illustrate positions of the runway projector control vanes and the resulting projected images corresponding to departures of the aircraft from the ideal position and/or attitude for normal progress along the desired landing path.

In Figs. 1, 2 and 3 is illustrated a composite projector system 11 arranged for stabilization about two perpendicular and normally horizontal axes and including a sky and ground representation projector 12 and a runway representation projector 13, rigidly interconnected. These projectors are both directed toward a projection screen 14 which may be normally carried upon a roller 15 positioned at or near the top of the windshield 16 of an aircraft. The roller 15 may be provided with an internal tension spring and the projection screen may be provided with means for fastening the lower edge thereof to a hook 17 connected to the craft at the bottom of the windshield.

The background projector 12 may include a hollow translucent shell 18 shaped substantially as a portion of a sphere including the equator thereof, and truncated above and below the equator. The portion of the spherical shell 18 extending above the equator may be tinted or otherwise arranged as a light filter, for projecting a distinctively colored light upon the upper portion of the projection screen 14. Preferably, the upper portion of the shell 18 may be colored blue so that blue light representing an expanse of sky is projected upon the upper portion of the screen 14. Similarly, the portion of the shell 18 beneath the equator may be colored green, for producing upon the lower portion of screen 14 a background color representing an expanse of land or sea, generally referred to hereafter as an "earth" or "ground" representation. Suitable directional or azimuth markings 90 are also provided thereon which may or may not have compass points thereon. Projections of these markings appear in Figs. 8 through 16 as 90'.

A light source 21, which preferably is a projection lamp having a concentrated filament structure, is arranged substantially centrally within the shell 18 for projecting the blue and green representation of sky and earth upon the screen 14. The sky and earth background projector 12 and the runway projector 13 are supported universally within the aircraft or trainer at a position preferably near the space normally occupied by the head of the pilot. The universal mounting for the composite projector system 12, 13 includes an inner gimbal ring 22 rigidly connected to the projector structure 12, 13 and journaled about a normally vertical axis within an intermediate gimbal ring 23. The intermediate gimbal ring 23 is in turn journaled within an outer gimbal ring or yoke 24 about an axis normally substantially parallel to the athwartship axis of the craft. The gimbal ring 24 is illustrated as journaled by means of cantilever bearings 25 within a member 26 which may be a structural member of the craft.

Although one or more gyroscope rotors could be provided within the shell 18 along with spinning means and precessional devices for stabilization thereof in accordance with well-known principles, it is preferred to stabilize the projector system 12, 13 by means of repeater motors under control of remote positional transmitters which may be connected to and controlled by gyroscopic instruments such as a gyro-vertical and a directional gyroscope. The use of such instruments with positional transmitters and remote electrical position repeating devices is well known, and therefore is not illustrated and need not be discussed in detail here.

A first positional repeater motor 27 is indicated schematically as fastened securely to the structural member 26 and coupled in any well-known manner to the shaft extension of the outer gimbal ring 24 for controlling the orientation of this ring about an axis substantially parallel to the longitudinal axis of the craft. Motor 27 may be connected to a positional transmitter coupled to a remote gyro-vertical about an axis also substantially parallel to the longitudinal axis of the craft. This motor serves to stabilize the projector system in "roll" or "bank." A second positional repeater motor 28 is illustrated as rigidly connected to and supported by the outer gimbal ring 24, and mechanically connected to drive the intermediate gimbal ring 23 about the normally horizontal journal axis thereof. The repeater motor 28, referred to as the "pitch" motor, may be connected to an electrical positional transmitter connected to a remotely positioned gyrovertical for stabilizing the projector system for variations in pitch of the aircraft. The equatorial or horizon line 18' of the sphere is hence stabilized about both horizontal axes and hence indicates the attitude of the craft.

A third positional repeater motor 29, referred to as the "azimuth" motor, is rigidly connected to and supported by the intermediate gimbal ring 23 and is mechanically coupled to the projector system to control this system about the vertical axis and, in cooperation with the roll motor 27 and the pitch motor 28, to maintain the orientation of the projector system rigidly fixed in space. The azimuth repeater motor 29 may be coupled to an azimuth transmitter driven by a gyro compass or a directional gyro or other azimuth stabilizing device. Markings 90 hence show the heading or attitude of the craft in azimuth.

The runway projector 13 positioned upon the background projector 12 comprises a light source such as a projection lamp 31, a lens system 32 arranged to collimate a beam of light from the source 31, a first light beam deflecting mirror or reflector 33 set to bend the collimated beam of light through an angle of substantially 90°, and a second inclined mirror or reflector 34 arranged to produce a second deflection of the collimated beam of light from source 31 toward a projection lens 35 and, through this lens, to the projection screen 14.

The lamp 31 and lens system 32 are illustrated as positioned within a lamp housing 37, and the mirror 33 is attached to this housing and arranged to direct the collimated light beam through an opening into a lower housing 38 which contains the second inclined mirror 34 and which supports, through a tubular focusing mount 39, the lens 35.

Figure 5:
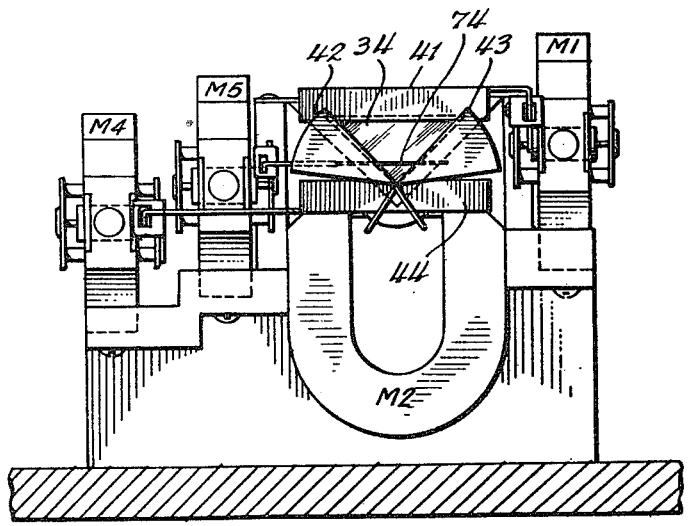
Fig. 5 is a sectional view taken along the line 5—5 and Fig. 6 is a sectional view taken along the line 6—6 in Fig. 4.
Figure 6:
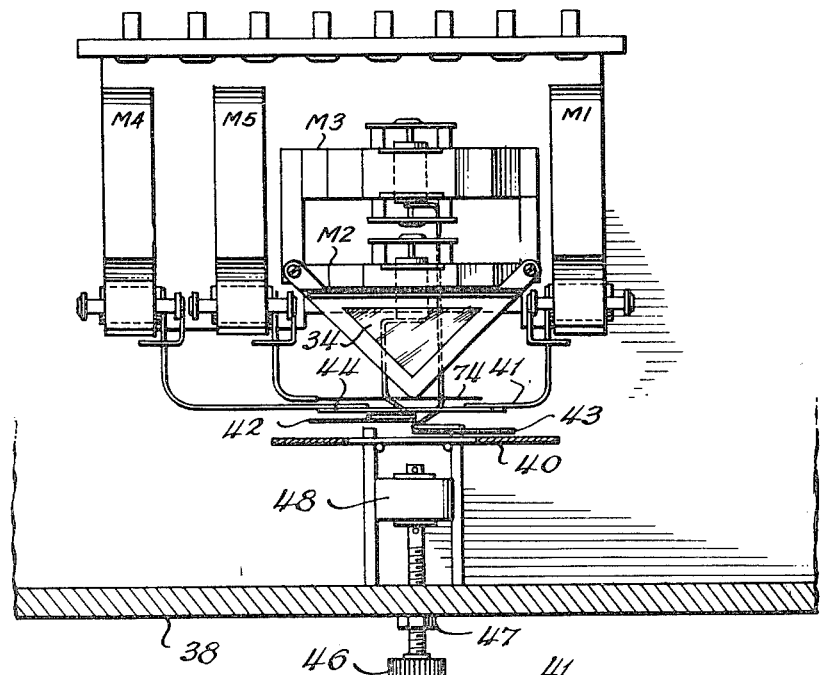

As illustrated in Figs. 4, 5 and 6, the lower housing 38 includes a fixed mask 40 and a plurality of movable vanes 41, 42, 43 and 44. The movable vanes 41, 42, 43 and 44, illustrated as coupled to the moving-coil elements of four galvanometer mechanisms M1, M2, M3 and M4, respectively, cooperate to fix the boundaries of the collimated light beam deflected from the mirror 34 toward the projection lens 35. By virtue of this use of the galvanometer mechanisms M1 through M4, the projector 13 is enabled to receive electrical signals for controlling the galvanometer movements and vanes and, thus, for fixing the proportions as well as the relative orientation of the runway representation presented upon the screen 14. In order that the edges of the runway representation on the screen will be made sharp and definite, the lens 35 is so positioned as to provide accurate focus for the region of the vanes 41, 42, 43 and 44. Each of the galvanometer mechanisms M1 through M4 is fully equivalent to the permanent-magnet and movable-coil assembly, including moving coil, hair springs, and counterweights, such as are found in conventional direct-current galvanometers.

If desired, the mask 40, the galvanometer movements M1 through M4, and the vanes controlled thereby, as well as the inclined mirror 34, may be built as a subassembly and arranged to be moved toward or away from the lens 35 in order to obtain correct relative positioning of the elements in the collimated beam of light transmitted downward from the reflector 33. For this purpose, an adjustment screw 46 and locking nut 47 may be provided in the front of the housing 38 and arranged to cooperate with a bushing 48 in the movable subassembly, which in turn is supported within guiding slots within the housing 38.

Figure 7:
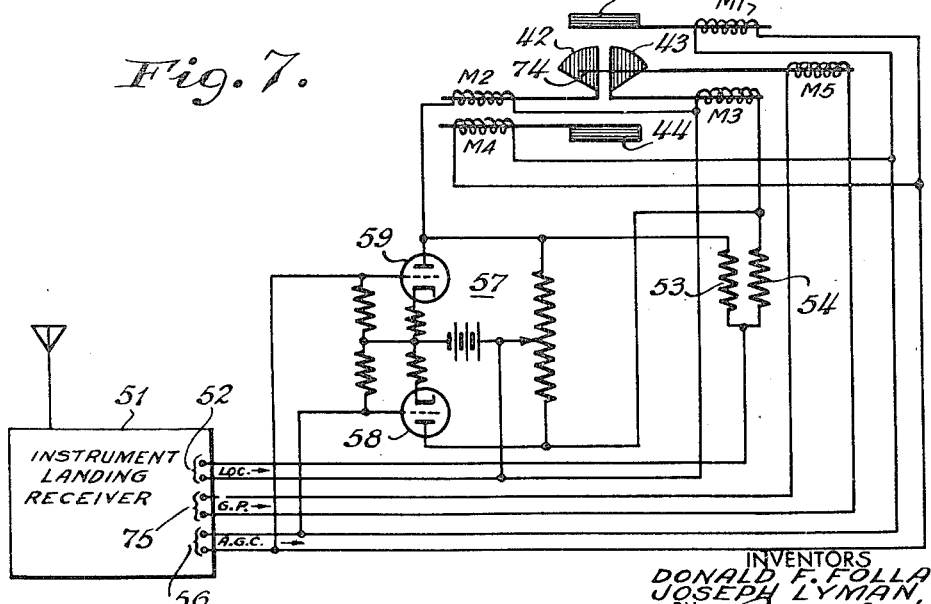
Fig. 7 is a circuit diagram showing an example of circuit interconnections between an instrument landing radio receiver and the controlling elements of a "runway" projector.

When the projector system 11 is installed within an aircraft for guidance of the pilot in conditions of limited visibility, an instrument landing radio receiver 51 (Fig. 7) positioned within the aircraft may be connected to the meter movements M1 through M4 for controlling the orientation and the relative proportions of the runway representation projected upon the screen 14. The lateral displacement signal or localizer signal provided by the instrument landing receiver at a pair of terminals 52 may be applied to the meter movement M2 through a series resistor 53 and to the meter movement M3 through a series resistor 54. The polarization of the connections of the receiver localizer output terminals to the movements M2 and M3 is such as to produce clockwise rotation of both of vanes 42 and 43 for a localizer output voltage of a first polarity and to produce counterclockwise rotation of vanes 42 and 43 for a localizer output voltage of the opposite polarity.

The automatic gain control voltage developed within receiver 51, or any other voltage which varies as a function of the distance between the aircraft and the airport, may be supplied at a pair of terminals 56 and arranged to control a conventional push-pull direct-coupled amplifier 57 including a pair of electron discharge devices 58 and 59 having their output circuit connected to meter movements M2 and M3 in such a sense as to produce counterclockwise rotation of vane 42 and clockwise rotation of vane 43 in accordance with an increasing automatic gain control signal voltage across terminal pair 56. The A. G. C. voltage appearing across terminals 56 is also applied to the meter movements M1 and M4 for varying the apparent extent of the runway representation upon screen 14, lengthening this representation as the automatic gain control voltage increases.

With this connection of an instrument landing radio receiver to the meter movements M1, M2, M3 and M4, the vanes 41 through 44 are made to change the orientation and the proportions of the runway representation upon screen 42 in accordance with the position of the airplane relative to the desired point of contact with the runway and also relative to the landing path defined by the radio instrument landing system. As illustrated in Fig. 8, when the aircraft is very distant from the airport, the vanes 41 through 44 form an almost entirely closed mask, such that a very compact runway representation 71 of only slight perspective appearance is formed upon the screen 14. Such a view may correspond to that seen at a distance of ten miles from the airport. As the aircraft progresses toward the point of contact with the runway, the successive positions of the movable vanes and the resulting proportions of the runway representation are as illustrated in Figs. 9 through 13. As indicated by Fig. 13, the aircraft has almost reached the point of contact on the runway, and an ideal attitude and position of the aircraft is indicated.

The departures of the aircraft from the desired attitude or from the desired landing path are indicated by variations of the picture projected upon the screen 14 from the normal conditions illustrated by the views in Figs. 8 through 13. For example, as illustrated in Fig. 14, the aircraft is accurately located upon the landing path, as indicated by the apparently vertical center line of the runway, and the attitude of the aircraft is correct as to pitch and bank, as indicated by the orientation of the horizon 72 which is seen to be substantially level and at the normal height upon the screen 14. The azimuthal heading of the craft, however, is in error, the craft being headed to the right of the desired landing path heading and, accordingly, the runway 71 appears in this view displaced to the left from the middle of the screen 14. The attitude illustrated in Fig. 14 might be desirable in the event of a crosswind from the pilot's right.

As indicated by the view seen in Fig. 15, the aircraft is banked with its right wing low, and the pitch of the aircraft is slightly "nose down" from its normal attitude. The aircraft in this view is displaced to the left of the vertical plane through the center line of the runway 71, ordinarily defined as the instrument landing localizer plane, and the azimuthal heading of the craft is substantially parallel with the runway 71. As shown in Fig. 16, the aircraft is substantially level and its azimuthal heading is substantially parallel with the runway 71, but the craft is slightly displaced to the right of the vertical plane through the center line of the runway 71. It will be noted that in all of these views, the trapezoidal aperture variably bounded by the vanes 41 through 44 appears to be inverted with respect to the runway representation 71; this is of course due to the inversion produced by the projection lens 35.

The apparatus thus far set forth projects upon the screen 14 a picture corresponding closely to the view normally seen by the pilot through the windshield 16 as he manipulates the controls of the aircraft to bring it toward a landing. During normal level flight of the aircraft as between distant cities, the background projector 12 may be employed and the runway projector 13 may be rendered inoperative. Thus, the background projector 12 serves to give the pilot an illusion of the sky and ground joining at a horizon line.

It may be desirable to provide upon the projection screen 14 an indication of the azimuthal heading of the craft. For this purpose, calibration marks or numerals may be positioned upon the spherical shell 18 along the equator, so that enlarged reference indications or numerals are projected upon the screen 14 corrsponding to the azimuthal heading of the craft.

It may be desirable, also, for the execution of accurate aircraft landings in reliance upon the simulated view of the sky, the ground and the runway, to provide an indication of the projected point of contact upon the runway 71. For this purpose, a fifth galvanometer movement M5 (Figs. 5 and 6) may be included within the housing 38, and provided with a needle 74 extending across the trapezoidal aperture bounded by the vanes 41 through 44. (See line 74' in Fig. 12.) The galvanometer movement M5 may be coupled to the glide path output terminals 75 of the instrument landing receiver 51 for this purpose.

Test observations of repeated aircraft landings made with a distinctive mark upon the runway at a desired point of contact thereon show that during the landings at a constant glide angle, the angle of vision between the horizon and the chosen landing point remains substantially constant during ideal progress of the aircraft. Accordingly, it will readily be seen that during an ideal instrument landing when no output voltage is present between the glide path output terminals of the receiver, the point-of-contact indicating needle remains stationary with its projection appearing at a constant separation from the horizon, while the perspective proportions of the runway change appreciably in the manner illustrated in the successive views of Figs. 8 through 13. If desired, moreover, for even greater precision in the execution of instrument landings, a reference dot may be provided as upon the inclined reflector 34 for indicating the normal or neutral position of the predicted point-of-contact needle.

While the above discussion has been concerned chiefly with the indication of airport runways of finite length, the present invention is equally well adapted to the simulation of an artificial straight and level highway extending between distant cities or terminal points of a flight. In effect, this amounts simply to an indication of a runway of infinite length. Accordingly, the vanes 41 and 44 are deflected or removed from the range of positions in which they limit the runway representation into a trapezoidal figure, and the runway representation thus becomes a triangle having its apex representing the vanishing point upon the horizon and having a narrow base along the bottom of the projection screen 14. Such an infinite runway representation may be relied upon, in a manner generally similar to that previously described for landing information, as to the attitude of the aircraft and its position relative to a vertical plane extending along the runway.

Although the present invention is illustrated herein as embodied in a system including a projector and a large projection screen having an area comparable to the windshield area through which the pilot normally views the earth and sky, it will be readily apparent to those skilled in the art that other optical systems may be employed for simulating a portion of the view normally seen ahead of the pilot. It is desirable for an illusion of naturalness that the angle of vision from the pilot's viewpoint be comparable to that through which he normally views an expanse of earth and sky, but it is not absolutely essential that such a large angle of vision be provided.

Furthermore, as is well known, reflecting surfaces or "combining glasses" may be employed for convenient location of the apparatus required to simulate the outdoor view provided in the present invention, while permitting the pilot to see this view generally ahead of him and thus in its most natural orientation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is called is:

1. Apparatus for simulating the scene viewed by a pilot of a moving aircraft, comprising a projection screen so positioned at an appreciable distance from the pilot's eye as to substantially fill the area through which the pilot normally views the scene generally ahead of the aircraft, and means for representing upon said screen a simulated perspective view of a runway oriented in accordance with craft positional data and a stabilized image corresponding to the apparent junction of sky and land.

2. Apparatus for simulating the scene normally viewed by a pilot of a moving aircraft, comprising a projection screen so positioned at an appreciable distance from the pilot's eye as to substantially fill the area through which the pilot normally views the scene generally ahead of the aircraft, means for representing upon said screen an image resembling the scene normally viewed ahead of the pilot including a simulated horizon and runway, and means including a direction maintaining means for varying the orientation of said image relative to said screen accordingly as the space orientation of said screen is varied.

3. Apparatus as defined in claim 2, wherein said image representing means includes means for varying the orientation of said runway in accordance with craft positional data.

4. Apparatus for producing a representation of that scene normally representative of that viewed by a pilot of a moving aircraft during a landing procedure, comprising a picture screen so positioned at an appreciable distance from the pilot's eye as to appear to fill the area through which the pilot normally views the scene generally ahead of the aircraft, means for representing upon said screen a background image simulating sky and earth meeting at a horizon line, and means for superimposing upon the earth-representing portion of said background image a perspective representation of a runway extending along the earth.

5. Apparatus for simulating the scene normally viewed by a pilot of a moving aircraft during a landing procedure, comprising a viewing screen so positioned at an appreciable distance from the pilot's eye as to appear to fill the area through which the pilot normally views the scene generally ahead of the aircraft, means for representing upon said screen a background image representing sky and earth meeting at a horizon line, means for superimposing upon the earth-representing portion of said background image a perspective representation of a runway extending along the earth, and means for varying the orientation of said runway image relative to said horizon line for representing variations of the position of the moving aircraft relative to the runway.

6. Apparatus for simulating the scene normally viewed by a pilot of a moving aircraft during a landing procedure, comprising a viewing screen so positioned at an appreciable distance from the pilot's eye as to appear to fill the area through which the pilot normally views the scene generally ahead of the aircraft, means for representing upon said screen a background image simulating sky and earth meeting at a horizon line, means for superimposing upon the earth-representing portion of said background image a perspective representation of a runway extending along the earth, and means for varying the perspective proportions of said runway for simulating variation of the distance of the aircraft from the runway.

7. Apparatus for simulating the scene normally viewed by a pilot of a moving aircraft during a landing procedure, comprising a projection screen so positioned at an appreciable distance from the pilot's eye as to appear to fill the area through which the pilot normally views the scene generally ahead of the aircraft, means for projecting upon said screen a background image representing sky and earth meeting at a horizon line, means for superimposing upon the earth-representing portion of said background image a perspective representation of a runway extending along the earth, and means for varying the orientation of said runway representation relative to said horizon and for varying the proportions of said runway representation for simulating positional variations of said aircraft.

8. Apparatus as defined in claim 7, further including means for varying the orientation of said horizon line relative to said screen for representing variations of attitude of the moving aircraft.

9. Apparatus for indicating to a pilot the progress of an aircraft, comprising a picture presentation screen positioned for visual reference by the pilot, means for forming on said screen an image of the sky and ground and the horizon junction line therebetween, means operatively coupled to said image-forming means for varying the orientation of said horizon line on said screen for indicating variation of aircraft attitude, means for superimposing upon said image a representation of a runway extending along the ground, and means for varying the orientation of said runway representation relative to said horizon line for indicating variation of aircraft position relative to a represented runway.

10. Apparatus for indicating to a pilot the progress of an aircraft, comprising a picture presentation screen positioned for visual reference by the pilot, means for forming on said screen an image of the sky and ground and the horizon junction line therebetween, means including a gyroscope for stabilizing said image-forming means to retain said horizon line substantially horizontally oriented with reference to the pilot's viewpoint, means for superimposing upon said image a representation of a runway extending along the ground, and means for varying the orientation of said runway representation relative to said horizon line for indicating variation of the aircraft position relative to the represented runway.

11. Apparatus for indicating to a pilot the progress of an aircraft, comprising a picture presentation screen positioned for visual reference by the pilot, means for forming on said screen an image of the sky and ground and the horizon junction line therebetween, means operatively coupled to said image-forming means for varying the orientation of said horizon line on said screen for indicating variation of aircraft attitude, means for superimposing upon said image a representation of a runway extending along the ground, and an instrument landing radio receiver coupled to said superimposing means and supplying instrument landing positional data thereto for varying the orientation of said runway representation relative to said horizon line and thereby indicating variation of the aircraft position relative to the represented runway.

12. Apparatus for indicating to a pilot the progress of an aircraft, comprising a picture presentation screen positioned for visual reference by the pilot, means for forming on said screen an image of the sky and ground and the horizon junction line therebetween, gyroscopically controlled means for stabilizing said image-forming means to retain said horizon line substantially horizontally oriented with reference to the pilot's viewpoint, means for superimposing upon said image a representation of a runway extending along the ground, and an instrument landing radio receiver coupled to said superimposing means and supplying instrument landing positional data thereto for varying the orientation of said runway representation relative to said horizon line and thereby indicating variation of the aircraft position relative to the represented runway.

13. Apparatus for simulating the perspective view of a runway normally seen by a pilot of a moving aircraft during an aircraft landing in clear visibility, comprising a projection screen for receiving a runway picture presentation, a light source arranged to illuminate a portion of said screen, a plurality of movable vanes interposed between said light source and said screen, and electric signal responsive means coupled to said vanes for varying the boundaries of the area of said screen illuminated by said light source.

14. Apparatus for simulating the perspective view of a runway normally seen by a pilot of a moving aircraft during an aircraft landing in clear visibility, comprising a projection screen for receiving a runway picture presentation, a light source arranged to illuminate a portion of said screen, a plurality of movable vanes interposed between said light source and said screen, electric signal responsive means coupled to said vanes for varying the boundaries of the area of said screen illuminated by said light source, and an instrument landing radio receiver having electric signal output circuits coupled to said signal responsive means for varying the boundaries of said area of illumination in accordance with variation of the positional data signals supplied by said instrument landing receiver.

15. Apparatus as defined in claim 14, further including a galvanometer having an indicator member positioned intermediate said light source and said screen for producing a variably positioned indicium in the illuminated area of said screen, said galvanometer being connected to said receiver and controlled in accordance with an output signal therefrom.

16. Apparatus for indicating to a pilot the orientation of an aircraft, comprising a picture presentation positioned for visual reference by the pilot, means for forming on said screen a simulated runway and an image of the sky and ground and the horizon junction line therebetween, said image-forming means comprising a translucent spherical shell having a light source located substantially centrally therein and having distinctively shaded sections above and below the equator thereof, and means for varying the orientation of said spherical shell about a plurality of axes relative to said projection screen for indicating variations of aircraft attitude about said axes.

17. Apparatus for indicating to a pilot the orientation of an aircraft, comprising a picture presentation screen positioned for visual reference by the pilot, means for forming on said screen a simulated runway and an image of the sky and ground and the horizon junction line therebetween, said image-forming means comprising a translucent spherical shell having a light source located substantially centrally therein and having distinctively shaded sections above and below the equator thereof, and means for maintaining the equator of said spherical shell in substantially horizontal orientation.

18. Apparatus as defined in claim 17, further including azimuth indicating marks upon said spherical shell for superimposing azimuth information upon said image for orienting said simulated runway, and means for stabilizing said spherical shell about the vertical axis for maintaining said superimposed azimuth indications fixedly oriented in space.

19. Apparatus for simulating the scene normally viewed by a pilot of a moving aircraft, comprising a viewing screen positioned to substantially fill the area through which the pilot normally views the scene generally ahead of the aircraft, means for representing upon said screen an image resembling the scene normally viewed ahead of the pilot including two distinctively shaded areas having a junction line therebetween to form a simulated horizon line, and means including a direction maintaining means for varying the orientation of said image relative to said screen accordingly as the space orientation of said screen is varied.

20. Apparatus for indicating to a pilot flight conditions of an aircraft, comprising a picture presentation screen positioned for visual reference by the pilot, means for forming on said screen a sky and ground image, stabilizing means for said image forming means, means superimposing a runway representation on said image forming means, and radio receiving device adapted to be operated from a localizer beam for displacing said runway representation when the craft is not flying in the proper direction to land on said runway.

21. Apparatus for simulating the scene viewed by a pilot of a moving aircraft, comprising a viewing screen positioned to substantially fill the area through which the pilot normally views the scene generally ahead of the aircraft, and means for representing a stabilized image on said screen, said image comprising two distinctively shaded areas having a junction line therebetween corresponding to the apparent junction of land and sky.

22. The apparatus of claim 1 in which said runway is of infinite apparent length.

23. The apparatus set forth in claim 1 further including means for superimposing on said runway image an indication of a proposed point of contact of the craft on the runway, and glide path means for varying said point of contact presentation in response to craft positional variation with respect to a predetermined glide path.

DONALD F. FOLLAND.
JOSEPH LYMAN.

REFERENCES CITED

The following references are of record in the file of this patent:

UNITED STATES PATENTS

| Number | Name | Date |
|---|---|---|
| 2,178,637 | Link | Nov. 7, 1939 |
| 2,262,245 | Moseley et al. | Nov. 11, 1941 |
| 2,381,872 | Baker | Aug. 14, 1945 |
| 2,426,184 | Deloraine et al. | Aug. 26, 1947 |

FOREIGN PATENTS

| Number | Country | Date |
|---|---|---|
| 11,442 | Great Britain | July 4, 1912 |